April 9, 1957  G. A. CARTER  2,788,037
CORING MACHINE
Filed Jan. 24, 1955  2 Sheets-Sheet 1
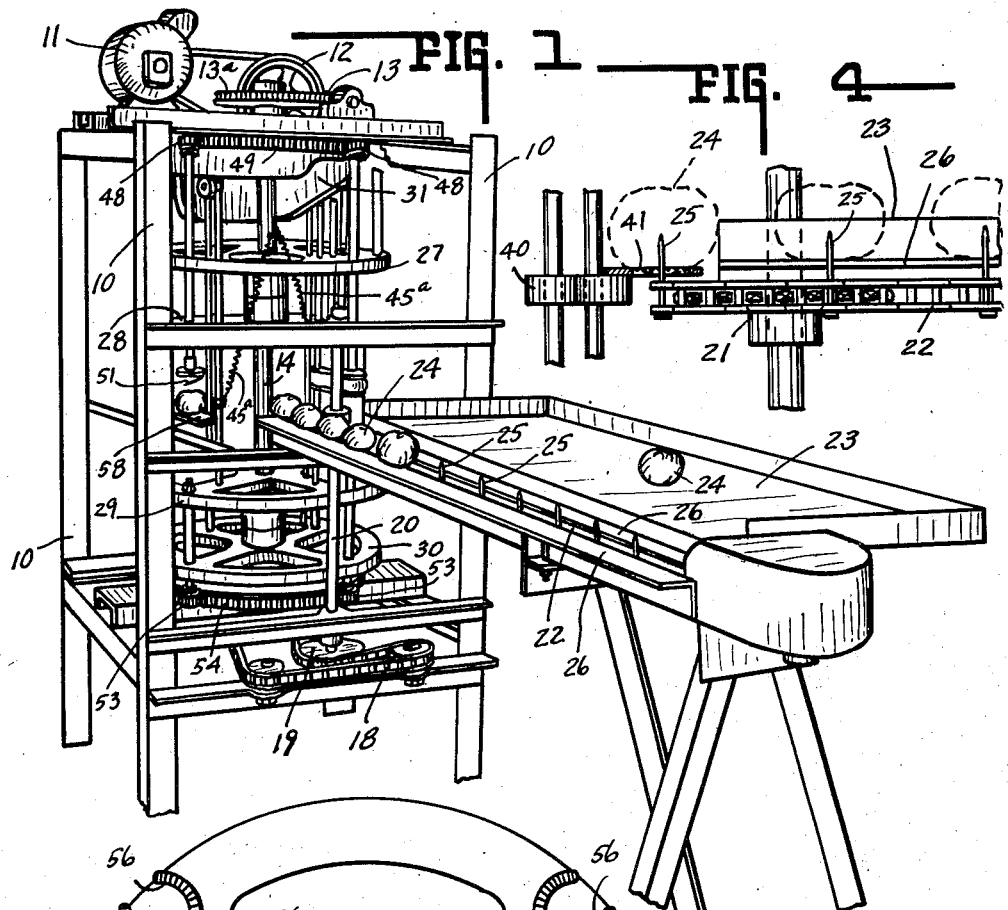
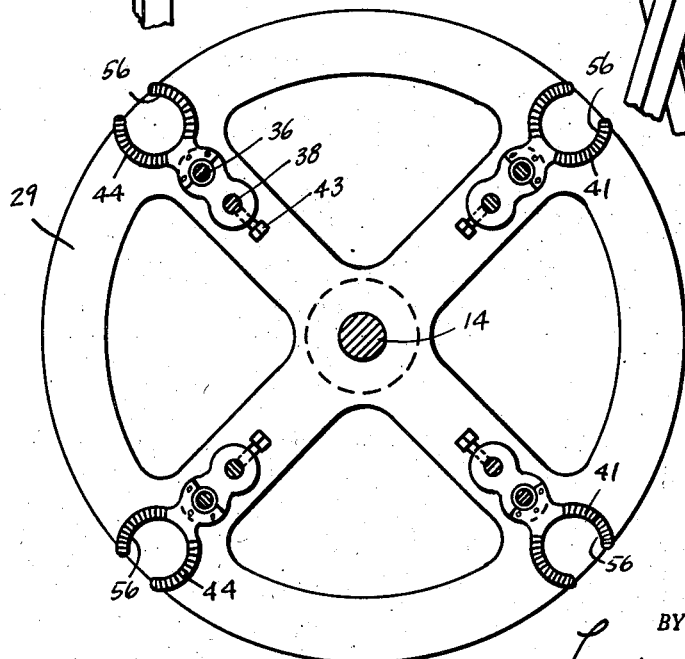
INVENTOR.
GEORGE A. CARTER.
BY
Lockwood, Galt, Woodard & Smith,
ATTORNEYS.

April 9, 1957 G. A. CARTER 2,788,037
CORING MACHINE
Filed Jan. 24, 1955 2 Sheets-Sheet 2

INVENTOR.
GEORGE A. CARTER.
BY
Lockwood, Galt, Woodard & Smith.
ATTORNEYS.

United States Patent Office 2,788,037
Patented Apr. 9, 1957

2,788,037

CORING MACHINE

George A. Carter, Swayzee, Ind.

Application January 24, 1955, Serial No. 483,578

7 Claims. (Cl. 146—52)

This invention relates to a coring machine particularly applicable to the coring of tomatoes, apples and other fruits, as well as applicable vegetables. It is designed to speed up the coring operation and improve the quality of such processing, coring both top and bottom of the produce in the same operation.

The invention is, therefore, directed broadly to automatic feeding mechanism for feeding the produce into the machine in timed relation with gripping devices which thereupon engage the produce and present it alternately to opposed coring knives which cut and remove the core, whereupon the produce is released to a hopper.

The feeding mechanism comprises a roller chain running in a horizontal position having small produce impaling pins extending upwardly therefrom. As the chain and pins travel past a working table, the produce is impaled on the pins axially of the core thereof. The pins, through the medium of the endless chain operating in timed relation with the machine, carry the produce into position for gripping levers to grip opposite sides of the produce, lifting it from the impaling pins toward a rotating coring knife which removes the upper portion of the core. The machine then carries the produce in its gripped position into position for lowering it to be engaged by a lower coring knife which removes the lower portion of the core, whereupon the produce is carried to a position where the gripping levers are released, freeing the produce which is thereupon swept into a discharge hopper.

The full nature of the invention will be understood from the accompanying drawings and the following description and claims:

Fig. 1 is a perspective view showing the coring machine with the produce feeding mechanism moving in timed relation therewith for feeding produce thereto.

Fig. 3 is a sectional view of the machine taken on the line 3—3 of Fig. 2.

Fig. 4 is an enlarged view partly in section of the transfer station for transferring the produce from the feeding belt to the coring machine.

Figure 2:
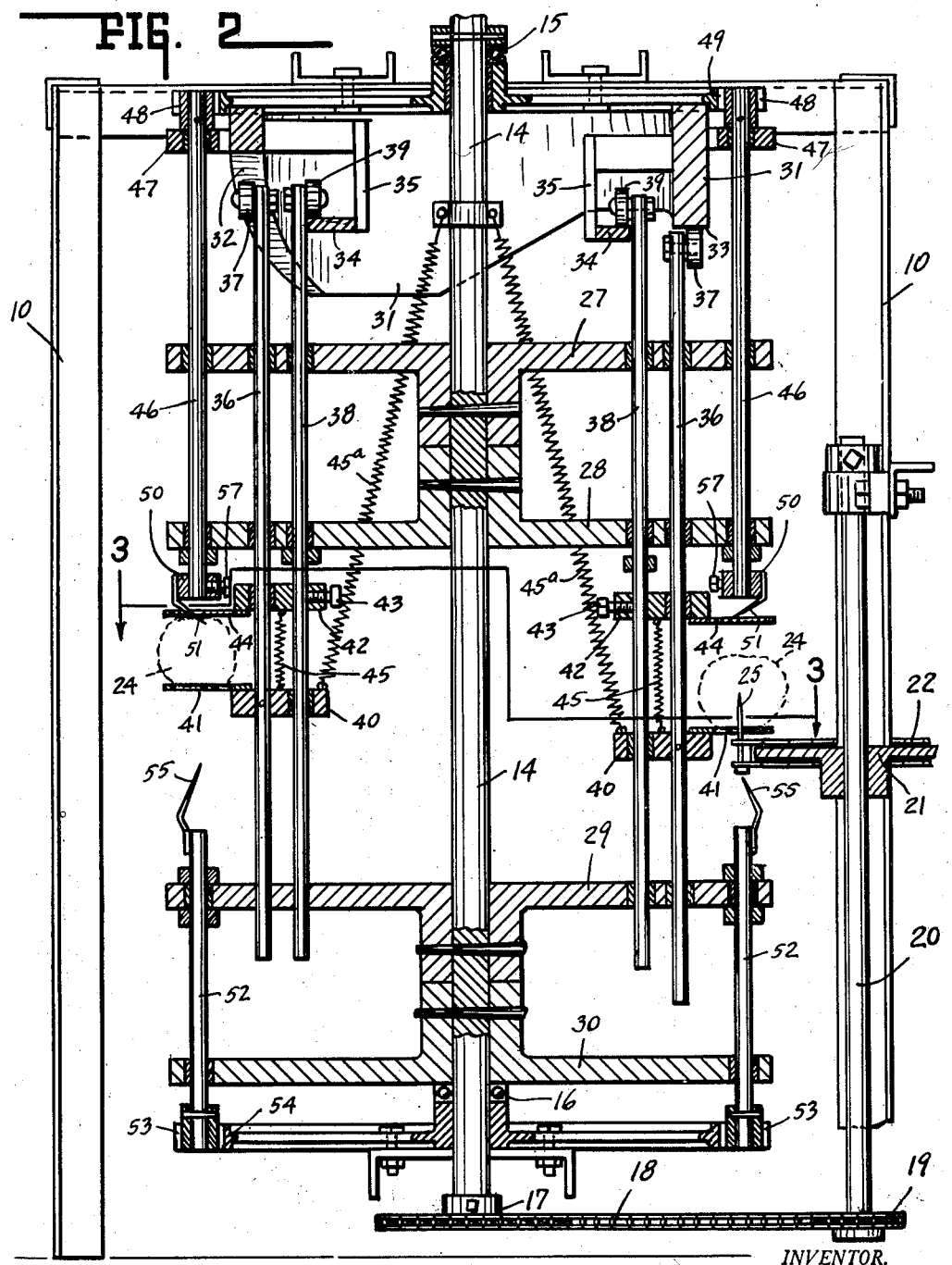
Fig. 2 is a central vertical section through the machine with portions in elevation.

In the drawings there is shown one modification of the machine and its feeding mechanism for coring produce such as tomatoes and the like, wherein the machine is in the form of a rotating turret into which the produce is fed in timed relation for presenting the produce to an upper coring station and then to a lower coring station as the turret revolves, the completion of one revolution of the turret having effected the coring operation both at the top and the bottom of the produce, freed it and swept it to a discharge hopper, not shown.

As illustrated herein there is shown a rotary coring machine embraced within and supported by a frame 10 on the top of which there is mounted a driving motor 11, which through a suitable belt drive drives the pulley 12 connected to the worm 13 which in turn drives the worm gear 13a secured to the upper end of a vertically and centrally disposed drive shaft 14. Said shaft is rotatably mounted upon upper bearings 15 and lower bearings 16 supported by the frame 10 and extending centrally thereof. At the lowermost end of the shaft 14 and adjacent the bottom of the frame there is secured a sprocket wheel 17 which, through the timing chain 18 drives the sprocket 19 secured to the shaft 20 which carries a sprocket 21 at approximately table level. The sprocket 21 drives the feeding mechanism in timed relation with the rotation of the shaft 14 for the purposes hereinafter described.

The feeding mechanism comprises essentially an endless roller chain belt 22 which passes about the sprocket 21 and suitable idler sprockets to travel in a horizontal plane at table height. Said chain belt travels longitudinally of the forward edge of a feed table 23 on which the produce 24 is carried for feeding into the machine. Said belt is provided with a series of spaced upright impaling pins 25 upon which the produce is impaled axially of the core as the belt passes along the forward edge of the feeding table. The belt is housed between a pair of produce supporting strips 26 so that the impaling pins travel along a gap therebetween with the produce carried thereon. The sprocket which drives the feeding belt, impaling pins and produce is positioned within the frame of the machine for presenting an impaling pin and produce carried thereby in juxtaposition to the gripping levers and in timed relation with the rotation of the turret carrying said levers.

The coring machine proper is in the general form of a rotating turret secured upon and rotated by the shaft 14 in timed relation with the introduction of the respective impaling pins thereto. It consists of a pair of upper spiders 27 and 28 secured to the shaft 14 and a pair of lower spiders 29 and 30 similarly secured thereto. Fixedly mounted at the top of the frame coaxially with the shaft there are a pair of stationary cams comprising an outer cam 31 having cam faces 32 and 33, and an inner cam segment 34 adjacent the cam face 33 and secured in position by a bracket 35. The outer cam 31 operates a plurality of angularly spaced spring loaded rods 36 through the cam followers 37. The inner cam 34 operates the related spring loaded rods 38 through the cam followers 39. Each rod 36 has secured thereto a collar 40 from which extends the lower gripping lever or fingers 41. Each rod 38 has secured thereto a collar 42 through the medium of the adjusting lock screw 43, said collar carrying the upper gripping lever 44. Each pair of collars 40 and 42 are connected together through a tension spring 45 tending to draw the gripping levers together into produce gripping position under spring tension. Tension of the springs 45 at the gripping position is such as to firmly hold the produce but without bruising it. The cam followers 37 are yieldably retained against the camming surfaces of cam 31 by tension springs 45a. Said rods extend through and have their bearings in aligned openings provided in the several spiders 27, 28 and 29 in respect to which they are adapted to be reciprocated by the cams 31, 34 and the springs 45a.

For mounting the upper coring knives there is a series of angularly spaced shafts 46 extending through and having their bearings adjacent the outer periphery of the upper spiders 27, 28. The upper ends of said shafts are rotatably retained and stabilized in their angularly spaced relation by the bearing ring 47 surrounding the cam 31. Each shaft carries a pinion 48 at its upper end driven by a stationary gear 49 secured to the upper frame work of the frame 10, immediately above the stationary cams 31 and 34, which gear meshes with and drives the pinions 48 and shafts 46 as the turret rotates relative to the frame. The lower end of each shaft, immediately below the spider 28, carries a coring head 50 adjustably secured thereto for rotation and having a downwardly and inwardly inclined coring knife 51.

Similarly, there are a plurality of upstanding coring shafts 52 having their bearings in and adjacent the periphery of the lower spiders 29, 30. Said shafts have secured to their lower ends the pinions 53 driven by the stationary gear 54 secured adjacent the lower end of the frame 10 above the sprocket 17. Fixed to the upper ends of each of the shafts 52 there is an inwardly and upwardly extending coring knife 55. Each of the gripping levers 41 and 44 are of annular form provided with a central opening 56 of sufficient diameter to permit the coring knives to extend therethrough for rotation therein. For purposes of adjustment of relative positions of the knives 51, 55 and the gripping levers the heads 50 on the shafts 46 carrying the knives 51 are made adjustable on said shafts through the adjusting screws 57.

In operation and with the motor 11 rotating the turret and driving the feeding belt 22, the produce such as tomatoes is manually impaled upon the pins 25 axially of their core. As each respective impaling pin and its produce is carried into alignment with the rotating gripping levers 41, 44 at the first station, the turret is rotated to position wherein the cam 31 permits the lever 41 to engage the lower side of the produce and lift it from its impaling pin to strip it and raise it into gripping contact with the upper gripping lever 44 under tension of the spring 45 as controlled by said cams. As the turret revolves, another impaling pin with its produce and a pair of gripping levers come into cooperating relation to pick up the next succeeding produce, all of which are picked up and clamped between the levers at the first or feeding station in timed relation with the progress of the pins and produce entering the machine. Further as the turret rotates swinging the first mentioned gripped produce to a second station, said levers with the gripped produce therebetween are raised into position for the coring knife 51 to enter into the opening 56 and remove the upper portion of the core, this being effected through the follower 39 riding up the short cam 34 to lift the collar 42 and lever 44 into coring position, the cam 31 permitting the spring 45 to cause the lower lever to follow.

Upon continued rotation of the turret, the cam 31 forces the lower lever 41 downwardly until it embraces the lower coring knife 55, the upper lever being carried therewith under tension of spring 45, which is free to follow due to release of its cam follower 35 from the short cam 34. Thereupon the lower portion of the core is removed. Continued rotation carries the produce to the discharge station wherein the follower 39 rides up the cam 34, lifting its lever 44 followed by lever 41 by the tension of spring 45 to the extent permitted by engagement of the follower 37 with the cam 31. The levers at this station, therefore, lift the produce from engagement with and free of the knife 55, but due to cam 31 will not permit upward movement of the levers to the extent that the upper knife 51 will be engaged. In this intermediate position between the two knives the levers are separated to free the produce against the tension of spring 45 through the downward movement of lever 41 caused by action of the cam 31 and simultaneous upward movement of the lever 44 effected through action of the short cam 34. With the produce thus free from the levers, it is caused to engage a discharge finger 58 which rolls or shoves the produce from the gripping levers into a suitable discharge chute, not shown, and hopper, not shown.

The invention claimed is:

1. A coring machine for the coring of core containing produce, including a movable feeding belt having a series of upstanding produce impaling pins, a turret, a pair of opposed gripping levers carried on the turret positioned to strip the produce from the respective pins and support it in gripped position, a pair of spaced rotatable coring knives associated with said levers, cam actuated means for moving said levers relative to each other under tension to grip and strip said produce from said pins, and means for moving said levers in unison to carry the gripped produce alternately into cutting engagement with said spaced knives, and means for rotating said knives and moving said belt and levers in timed relation.

2. A coring machine for the coring of core containing produce, including a movable feeding belt having a series of spaced upstanding produce impaling pins, a rotatable turret associated with said belt to which said produce is fed thereby, a plurality of pairs of opposed gripping levers carried by said turret the levers of each of said pairs being reciprocable on opposite sides of the produce embracing position of said impaling pins to grip and strip said produce from said pins, a plurality of pairs of opposed coring knives carried by said turret, each knife being rotatable on opposite sides of said produce embracing position, means for urging said levers together into produce gripping position, a mounting rod carrying each gripping lever, stationary cam members engageable by said rods during rotation of said turret for effecting relative movement of said levers to and from gripping position and effecting the joint raising and lowering thereof to present said produce alternately to said coring knives, means for rotating said knives, and means for driving said turret and feeding belt in timed relation.

3. A coring machine for the coring of core containing produce including a rotatable turret into which said produce is fed, a plurality of pairs of opposed reciprocable gripping members carried by said turret positioned to move successively into produce embracing position, with both core ends thereof exposed, a plurality of pairs of spaced coring knives, each knife associated with one of said gripping members and rotatable about an axis aligned with the exposed core ends, spring means for urging said members together into produce gripping position, a reciprocable mounting rod for each gripping member, stationary cam members with cam surfaces engageable by said rods during rotation of said turret for effecting relative movement of said members to and from gripping position and for effecting the joint raising and lowering thereof to present produce alternately to the respective coring knives.

4. A machine of the class described, a movable feeding belt having a series of spaced upstanding produce impaling pins, a turret, a plurality of pairs of opposed gripping members on said turret positioned relative to said belt and impaling pins to receive the produce therefrom and support it in gripped position, a pair of spaced opposed rotating coring knives, said knives being aligned with the core and on opposite sides of the produce to be cored, means for rotating said knives about the axis of the core, means for jointly moving said members and gripped produce to carry the produce alternately to the respective coring knives for coring first one end portion of the core and then the opposite end portion thereof, and means for moving said feeding belt and gripping members in timed relation.

5. A coring machine for the coring of core containing produce, including a movable feeding belt having a series of spaced upstanding produce impaling pins, said pins extending axially into the core of said produce, a movable carriage associated with said belt to which said produce is fed thereby, a plurality of pairs of opposed gripping fingers carried by said carriage positioned to move into produce embracing position, a plurality of pairs of upper and lower spaced and opposed rotating coring knives, each knife associated with one of said gripping fingers and rotatable about the axis of the core, means for urging said fingers together into produce gripping position, a mounting rod for each upper and lower gripping finger, stationary members engageable by said rods during movement of said carriage for effecting relative movement of said fingers to and from gripping position and effecting the joint raising and lowering thereof to strip said produce from said pins and alternately present it to the upper and lower coring knives, and means for moving said carriage and feeding belt in timed relation.

6. A coring machine for the coring of core containing produce including a movable carriage to which said produce is fed, a plurality of pairs of opposed produce gripping members carried by said carriage relatively movable into produce embracing position for receiving the produce fed thereto, a plurality of pairs of opposed coring knives, each knife being associated with one of said gripping members and rotatable about the axis of the core, means for urging said gripping members together into produce gripping position, cam means associated with said movable carriage, said cam means having a cam surface for effecting relative movement of said members to and from gripping position, and having another cam surface for effecting the joint movement thereof to present produce alternately to the respective coring knives, means for rotating said coring knives, and means for moving said carriage from produce receiving and gripping position through the several coring positions to produce-releasing position.

7. A coring machine for the coring of core containing produce including a movable feeding belt having a series of spaced upstanding produce impaling pins extending through a portion of the core axially thereof, a rotatable turret associated with said belt, a plurality of pairs of opposed gripping fingers carried by said turret positioned to move into produce embracing position and strip said produce upwardly from said pins, said fingers being spaced and having a passage therebetween for clearance of an impaling pin during relative movement of pin and turret, a plurality of pairs of upper and lower spaced and opposed coring knives, each knife being associated with one of said gripping fingers to extend through the opening therebetween and rotate about the axis of the core for cutting the upper and lower portions thereof from said produce, respectively, means for urging said fingers together into produce gripping position, a mounting rod for each upper and lower gripping fingers, stationary cam members engageable by said rods during rotation of said turret for effecting relative movement of said fingers to and from gripping position and for jointly raising and lowering said levers to present produce alternately to the upper and lower coring knives, means for rotating said knives, and means for driving said turret and feeding belt in timed relation.

References Cited in the file of this patent

UNITED STATES PATENTS

| | | |
|---|---|---|
| 1,982,779 | Ayars | Dec. 4, 1934 |
| 2,252,951 | Urschel et al | Aug. 19, 1941 |
| 2,703,123 | Buck | Mar. 1, 1955 |